United States Patent [19]

Wubs et al.

[11] Patent Number: 5,070,724

[45] Date of Patent: Dec. 10, 1991

[54] METHOD FOR CHECKING THE TIGHTNESS OF A CASING, AND DEVICE FOR CARRYING OUT SAID METHOD

[75] Inventors: Klaas Wubs, Asten; Adriaan Walraven, Dieren, both of Netherlands

[73] Assignee: Wubs Technologie B.V., Helmond, Netherlands

[21] Appl. No.: 556,490

[22] Filed: Jul. 24, 1990

[51] Int. Cl.[5] .......................... G01M 3/24; G01M 3/10
[52] U.S. Cl. .................................. 73/45.5; 73/40.50 A
[58] Field of Search ................... 73/40.5 A, 45.5, 45.8, 73/41.2, 41.3, 41.4

[56] References Cited

U.S. PATENT DOCUMENTS 2,961,869  11/1960  Bagno ................................. 73/45.5
3,465,572   9/1969  Covert ................................ 73/49.2

FOREIGN PATENT DOCUMENTS 77329  5/1984  Japan ................................. 73/45.5
 209009  3/1968  U.S.S.R. ............................ 73/45.5
 399753  2/1974  U.S.S.R. ............................ 73/45.5
1152404  5/1969  United Kingdom ................. 73/45.5

*Primary Examiner*—Hezron E. Williams
*Assistant Examiner*—Joseph W. Roskos
*Attorney, Agent, or Firm*—Edmund M. Jaskiewicz

[57] ABSTRACT

A method and device for checking the tightness of a casing which is, filled with a gaseous medium, immersed in a container with liquid medium placed in a chamber of which the interior is insulated for sound and vibrations, the output signals of a sensor in contact with the container wall being amplified, filtered and evaluated.

9 Claims, 3 Drawing Sheets

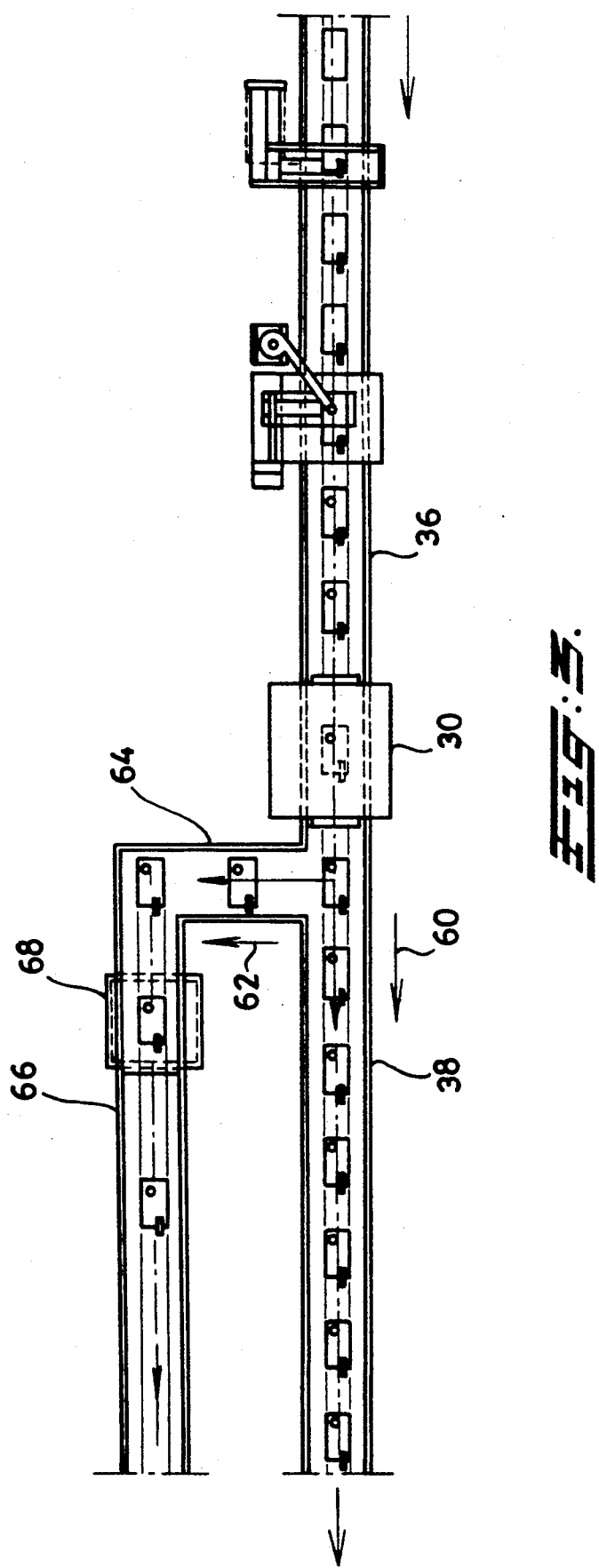

METHOD FOR CHECKING THE TIGHTNESS OF A CASING, AND DEVICE FOR CARRYING OUT SAID METHOD

BACKGROUND OF THE INVENTION

The invention relates to a method for checking the tightness of a casing, in which one fills it with a gaseous medium and immerses it in a liquid medium present in a container and observes whether or not gas bubbles escape from the casing.

DESCRIPTION OF THE PRIOR ART

Checking the tightness of a casing for a medium, in particular for a liquid medium, such as a heating radiator, an element of a heat exchanger, an evaporator of a cooling plant, or a petrol or oil tank, is in particular when a number of such casings have to be checked in series, a problem for which no satisfactory solution has yet been found. In general, such a check is carried out by temporarily filling the casing with a gaseous medium, in particular compressed air, subsequently immersing it in a liquid medium such as water, and observing whether gas bubbles rise out of the container. Not only does such a check require the constant presence and attention of an observer, but it has also been found in practice that not all leaks are detected with absolute certainty, in particular due to the slackening of attention on the part of the observer.

SUMMARY OF THE INVENTION

The object of the invention is to eliminate this drawback and provide a method and device of the above mentioned kind with which all leaks present are detected with absolute certainty.

This object is achieved in that the detection is carried out by processing and evaluating the output signals from a sensor which is in contact with a wall or wall part of the container and which converts vibrations thereof into electrical signals, said signals being subjected to amplification, filtering and/or comparing with reference signals, the container being placed in a chamber of which the interior is insulated for at least sound and vibrations with frequencies relevant for the detection of a leak.

A device for carrying out the process according to the invention comprises a container to be filled with a liquid medium, placed in a chamber of which the inside is insulated for sound and vibrations with frequencies relevant for the leakdetection and is provided with at least one wall or wall part which is such that this can be brought into vibration by escaping gas bubbles, said wall or wall part being connected to a vibration sensor which converts vibrations thereof into corresponding electric voltages, and further characterized by a signal processing circuit to which these voltages are supplied and which comprises in cascade a signalamplifier, a band-pass filter and a circuit for evaluating the output signal thereof.

It has been found in practice that the vibrations, which arise from the escape of gas bubbles from a leak and their bursting on the liquid medium surface, and which are transmitted through this medium up to the wall of the container, can set this wall in vibration in such a way that certain detection of such vibrations, and thus also of a leak, is possible. The fact that the vibration sensor need not be fixed to the wall in the medium but outside the medium, is in practice a great advantage, since this makes the choice of sensor considerably easier and gives the possibility of using very sensitive sensors which do not have to be insulated against moisture.

The use of band-pass filters placed in the path of the signal supplied by the vibration sensor in combination with the insulation of the interior of the chamber for sound and vibrations with frequencies, relevant for detecting the leak, makes the device in a high degree insensitive for external disturbances and thus increases the sensitivity considerably.

It is observed that testing the housing of a semiconductor component as to tightness by submersing the same in a hot liquid and acoustically detecting the gas bubbles, escaping by the overpressure therein, is known in itself from JP-A-57137836 (Patent Abstract of Japan, vol. 6, no. 237 (P157) [1115]). A similar principle, in which the casing is brought under overpressure via an external source and the sound generated by the escaping air bubbles is detected by a hydrofone is described in U.S. Pat. No. 966,516.

U.S. Pat. No. 2,961,869 describes the use of amplifier—and filtercircuits in a leak detection device which is based on a completely different principle, namely: emitting high frequency vibrations in a container filled with liquid in which the casing to be tested is placed and detecting vibrations reflected by emerging gas bubbles.

It is pointed out that the method and device according to the invention can be used not only in conjunction with casings which are filled with a gaseous medium solely for checking the tightness, but also for those casings which are normally under a certain excess pressure from a gaseous medium. One thinks here for instance of packs for foodstuffs or luxury items such as crips, snacks, chocolate products and ready salads.

DESCRIPTION OF THE FIGURES

The invention is explained with reference to the accompanying figures, in which:

FIG. 1a is a portion in enlarged scale of the wall in FIG. 1 to show the thinner wall portion and a sensor fixed thereon;

FIG. 3 shows schematically a part of a production line for radiators in which the plant according to FIG. 2 is accommodated.

DESCRIPTION OF PREFERRED EMBODIMENTS

Figure 1:
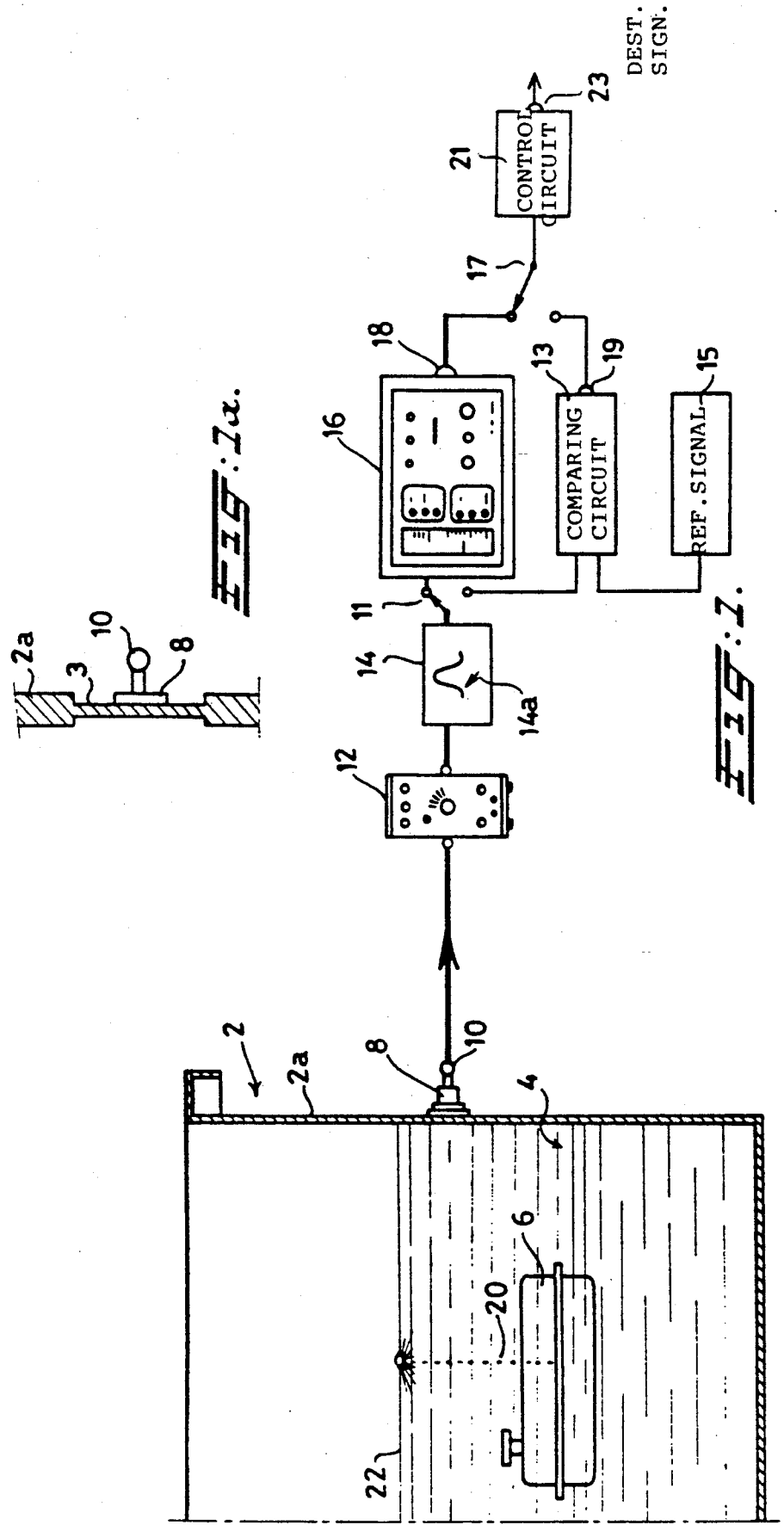
FIG. 1 is a schematic view of a device according to the invention.

FIG. 1 indicates by reference number 2 a container which is partially filled with a liquid medium 4, for example water, and in which a casing 6, whose tightness is to be checked, is immersed. Prior to the immersion, the casing 6 is filled with a compressed medium, for example air. Fixed on the wall 2a of the container 2 is a vibration-sensitive sensor 8, for example a piezoelectric sensor which delivers electrical output signals to the connection 10 whose amplitude and frequency correspond to those of the vibrations picked up by said sensor. FIG. 1a shows a preferred way of positioning the piezo-electric sensor according to which this sensor 8 is fixed to a thinner wall part 3 in the wall 2a. The fixing can be done in any suitable way, for instance by gluing or by means of mechanical fastening elements. The electrical signals are fed to an amplification stage 12, the output of which is connected to an adjustable band-pass filter which by means of the selector switch 14a can be set at central frequencies of approximately 2, 4 and 8 KHz; the passed signals are fed to an evaluation circuit by means of a two-position switch 11.

This evaluating circuit can comprise a monitor 16 with output terminal 18 which is connected with the uppermost terminal of the two-position switch 17. By means of this monitor one observes whether or not the signal at its input which, as said, represents the vibrations detected by the sensor 8 exceeds the background noise signal with a certain amount, for instance 10 dB. This observing can be done visually but the monitor 18 can also be constructed in such a way that its output terminal 18 carries a signal of predetermined amplitude and shape when this condition is met.

However, the evaluating circuit can also be based on comparing as to wave form and amplitude the measuring signal, as this occurs at the input terminal of the switch 18 with a reference signal which is obtained by positioning in the container 2 a casing with a predetermined, known leak and by recording, for instance magnetically or optically, the signal which then arises. Reference numeral 15 schematically shows such a reference signal source which generates this recorded reference signal and its output signal is supplied to the comparing circuit 13 to which in the lower position of the switch 11 also the measuring signal is supplied; when there is coincidence—which points to the presence of a leak—the output 19 of the comparing circuit carries a signal which indicates the presence of a leak.

The output signals of monitor 16 and comparing circuit 13 respectively are supplied via the two-position switch 17 to a control circuit 21 of which the signal, present at its output terminal 23, determines the destination of the leaking casing in a way which will be described later on.

If the casing 6 shows a leak, a stream of air bubbles 20 will rise from it and burst apart at the surface 22 of the medium 4. The vibrations caused by the escape and bursting are transmitted to the wall 2a of the container 2 and thus also to the vibration sensor 8. It has been found that major leaks, resulting in large gas bubbles, cause vibration frequencies which are considerably lower than the vibration frequencies caused by very small leaks, and through the correct selection of the pass-band of the filter 14 both large and very small leaks can be detected with great accuracy.

Leaks in a very great variety of casings can be detected in this way; for example, heating radiators, heat exchangers, fuel tanks, etc., but also in considerably smaller casings filled under excess pressure, such as packs filled under excess pressure for foodstuffs and luxury products such as, for example, crisps.

Process and device according to the invention are particularly suitable for use in a continuous testing process, to be carried out at the end of a production line. This is shown schematically for radiators in FIG. 2.

Figure 2:
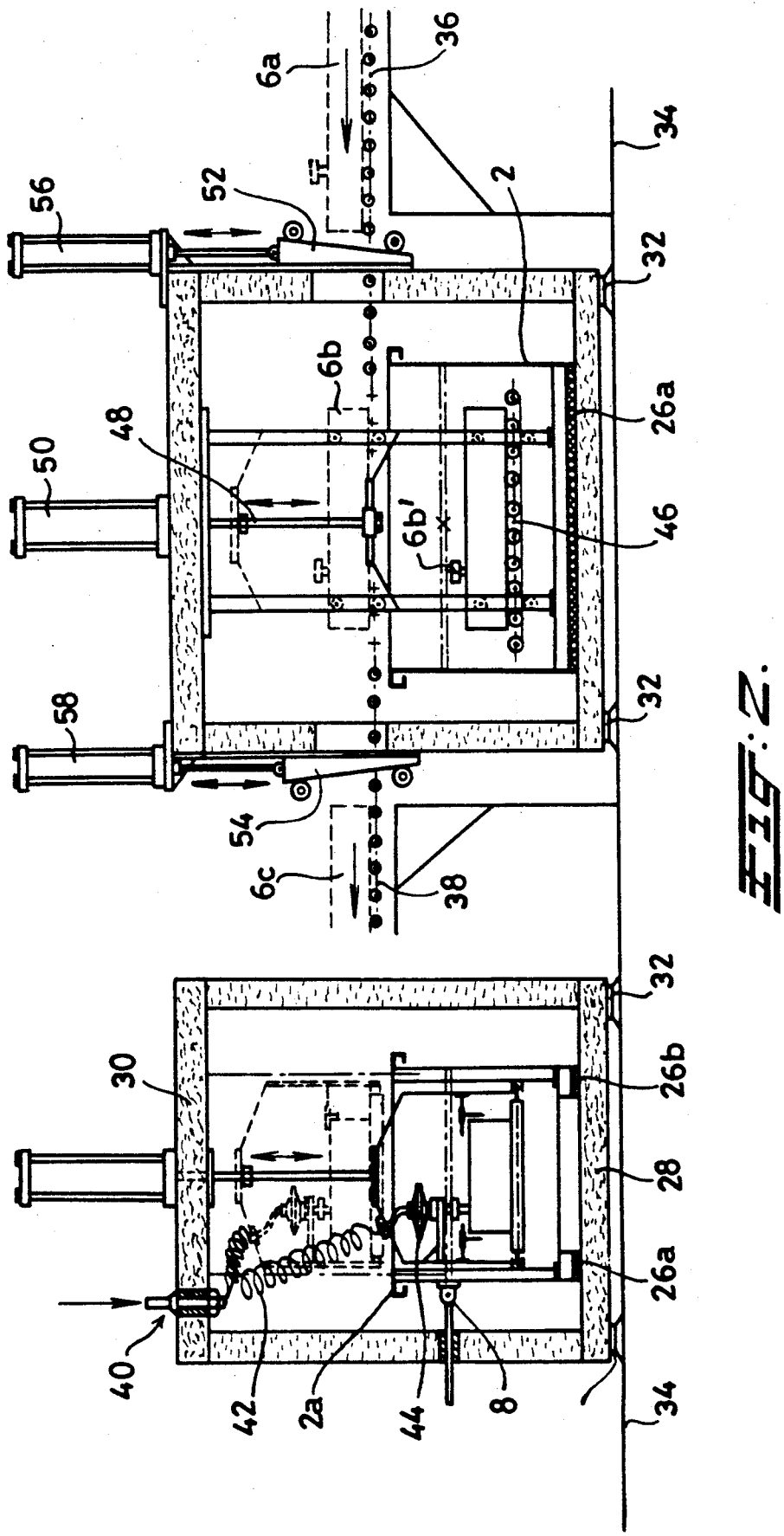
FIG. 2 shows schematically a plant in which such a device is used.

FIG. 2 shows how the container 2 is placed on vibration insulators 26a, 26b on the bottom 28 of a sound-insulated (chamber which itself rests by means of a suitable) number of vibration insulators on a foundation 34. As shown for the radiator 6a, the radiators to be tested are conveyed in on a feed belt 36, subsequently tested (as indicated for the radiator 6b), and discharged onto a discharge belt 38, as indicated for the radiator 6c. Of course, these radiators can be placed under excess pressure outside the test chamber, prior to immersion in the container 2, and the shut off, but it is also possible to connect each radiator to be tested, after it has passed into the test chamber, to a compressed air source of the type shown schematically by the compressed air connection 40, the hose 42 and the reducing valve with connection 44. A roller track part 46, connected by suitable suspension means to the control rod 48 of a hydraulic or pneumatic working cylinder 50 is used to lower the radiators for testing into the container 2 and remove them therefrom. Shut-off doors 52, 54 which can be moved up and down in the vertical direction, and which are suspended from the working cylinders 56, 58, complete the plant.

The testing process is simple: after the placing of a radiator, such as the radiator 6b, in the test chamber, the connection between reducing valve 44 and the connection branch 6b' of the radiator 6b is made, following which the doors 52 and 54 are closed, and the signals delivered by the vibration sensor 8 are picked up and evaluated. On completion of the test the doors 52 and 54 are opened, the connection to the branch 6b' released, the radiator 6b is removed from the chamber, and a new radiator is fed into the chamber.

FIG. 3 shows how such a plant can be installed in a simple manner at the end of a production line for radiators. The chamber 30 is provided between the feed conveyor 36 and the discharge conveyor 38; if the output signal occurring at the output 18 of the monitor 16 indicates that a tested radiator has been found satisfactory, it is discharged there in the direction of the arrow 60 on the conveyor 38, but if a signal which indicates the presence of a leak is encountered, the tested radiator is discharged in the direction of the arrow 62 via the transverse conveyor belt 64 to the conveyor belt 66, where an inspection and repair station 68 is located for further inspection on the radiator in question and possible carrying out of repairs on it.

What is claimed is:

1. A process for the detection of leaks in a casing comprising the steps of filling a casing to be tested for leaks with a gaseous medium, submersing the casing filled with a gaseous medium in a liquid medium contained in a container having a wall such that any gas bubbles escaping from the casing produce vibrations in at least a portion of the wall of the container, insulating the interior of the container for at least sound and vibration frequencies relevant for the detection of a leak, sensing vibrations on the outer surface of the wall portion of the container, and converting any sensed vibrations into electrical signals and comparing the electrical signals with reference signals to ascertain the existence of a leak.

2. An apparatus for the detection of leaks in a casing comprising a container having a wall and retaining a liquid medium therein in which a casing to be tested for leaks and filled with a gaseous medium can be submersed, said wall having at least a portion thereof which is capable of being vibrated by gas bubbles escaping from a said submersed casing, means on the interior of said container for insulating said interior for sound and vibration frequencies relevant for the leak detection, means on the exterior of said wall portion for sensing vibrations thereof and for converting any sensed vibrations into electrical signals, and electrical circuit means connected to said sensing and converting means for evaluating said electrical signals to ascertain the existence of a leak.

3. Device according to claim 2 wherein the circuit for signal evaluation is such that the level of the sensed signal is compared with a preset reference value.

4. Device according to claim 3, in which the output signal of the circuit for signal evaluation is converted into a control signal determining the destination of the tested casing.

5. Device according to claim 2 wherein the circuit for signal evaluation compares amplitude and wave shape of the sensed signal with the same of a predetermined reference signal which simulates a leak.

6. Device according to claim 2 wherein said electrical circuit means comprises three band-pass filters placed in the signal path and tuned to approximately 2, 4 and 8 kHz respectively.

7. Device according to claim 2 in which at least one wall of the container is is locally provided with a portion of smaller wall thickness to which a vibration sensor is fixed.

8. Device according to claim 2 and further comprises means in said chamber for connecting a casing to be tested to a source of pressure medium.

9. Device according to claim 2 wherein for in series testing of a plurality of casings including radiators, heat exchangers and/or fuel tanks comprising a chamber having feed and discharge appertures in which are mounted feed and discharge conveyor belts respectively for conveying said casings and which extend into said chamber, a support within said chamber between said feed and discharge belts, and means connected to said support and movable in the vertical direction, said container disposed within said chamber to receive said support with a casing thereon.

* * * * *